(12) United States Patent
Gur et al.

(10) Patent No.: US 7,805,119 B2
(45) Date of Patent: Sep. 28, 2010

(54) MULTI-FREQUENCY DETECTOR

(75) Inventors: Arie Gur, Kiriat Uno (IL); Israel Greiss, Raanana (IL)

(73) Assignee: D.S.P. Group Ltd., Herzliya (IL)

( * ) Notice: Subject to any disclaimer, the term of this patent is extended or adjusted under 35 U.S.C. 154(b) by 650 days.

(21) Appl. No.: 11/797,350

(22) Filed: May 2, 2007

(65) Prior Publication Data
US 2008/0274708 A1 Nov. 6, 2008

(51) Int. Cl.
H04B 1/16 (2006.01)
(52) U.S. Cl. .................. 455/205; 455/296; 455/63.1; 375/350; 375/261; 370/526; 370/352; 379/283; 379/88.24; 379/93.18
(58) Field of Classification Search .................. 455/205, 455/296, 63.1; 375/350, 261; 370/526, 352; 379/283, 88.24, 93.18
See application file for complete search history.

(56) References Cited

U.S. PATENT DOCUMENTS 5,257,309 A  10/1993  Brandman et al.
6,157,712 A  12/2000  Wikström
7,082,143 B1 *  7/2006  LeBlanc et al. ............. 370/526
2004/0002323 A1 *  1/2004  Zheng ........................ 455/324
2008/0226001 A1 *  9/2008  Geng et al. .................. 375/350

FOREIGN PATENT DOCUMENTS

EP  0 579 927 A2  5/1993

OTHER PUBLICATIONS

International Search Report for PCT/IL2008/000593; 2 pages.

* cited by examiner

Primary Examiner—Sanh D Phu
(74) Attorney, Agent, or Firm—The Nath Law Group; Derek Richmond; Jiaxiao Zhang

(57) ABSTRACT

The method provides a method and device for detecting in a single or multi frequency signal, one or more frequencies from a predetermined set of frequencies. The Signal is subjected to a complex filter substantially passing all of the frequencies in the predetermined set of frequencies. For each of one or more pairs of members of the complex filtered signal, a complex number $Y_d$ is determined having a phase indicative of a phase difference between the two members of the pair. The one or more frequencies are then determined based upon the one or more complex numbers. The method and device of the invention may be used in an apparatus such as a call indicator (CI) detector or a DTMF detector.

32 Claims, 6 Drawing Sheets

MULTI-FREQUENCY DETECTOR

FIELD OF THE INVENTION

This invention relates to methods and devices for detecting frequency modulated signals.

BACKGROUND OF THE INVENTION

A frequency modulated signal consists of a predetermined sequence of data bits (Dbits), where each Dbit type is transmitted as a signal having one or more frequencies from a predetermined set of specified frequencies. Use of a frequency modulated signal to transmit information over a communication line requires a detector capable of quickly detecting the signal even in a low signal to noise ratio environment.

For example, communication devices are known capable of transmitting and receiving voice as well as video signals. When a voice communication link has been established between two or more patties, and one of the parties decides to change the mode of communication from voice to video, the party transmits a CI (call indication) signal to the other party's device in order to inform the other party's device to change its mode of communication from voice to video. This CI signal is specified in the 1TU-V.8 standard, and is a frequency shift modulated signal known as the "T1-N0" sequence. This sequence consists of 10 ones ('1111111111') followed by 10 synchronization bits ('0000000001') and a call function octet ('0 byte data 1'). The standard further specifies that a "0" be transmitted as a 1180 Hz signal, and that a "1" be transmitted as a 980 Hz signal. These two frequencies, 980 Hz and 1180 Hz are referred to as the "FSK" (frequency shift key modulation) frequencies. The CI signal is transmitted with a regular ON/OFF cadence in which the ON periods are not less than 3 periods of the CI sequence, and are not greater than 2 sec in duration. The OFF periods are not less than 0.4 sec and not greater than 2 sec in duration.

A communication device capable of alternating between voice and video modes needs to include a CI signal detector, also known as a CI detector. When the CI detector identifies a CI signal received at the communication device from a remote communication device indicating that the remote device has changed from voice to video communication, the CI detector generates a signal causing its communication device to change from voice to video communication.

As another example, dual frequency (DF) signals, also known as dual-tone multiple frequencies (DTMF), are signals that are an additive combination of two equal-amplitude frequency components. Thus, the signal generated by depressing "1" on the telephone keypad is the sum of a 697 Hz and a 1209 Hz frequency signals, and the signal generated by depressing "5" is the sum of a 770 Hz and a 1336 Hz sine wave. DF signals are used for example, for representing telephone numbers and other signaling functions within a telephone system including interactive voice response.

SUMMARY OF THE INVENTION

The present invention provides a device for detecting a multi-frequency signal in a communication signal. The device of the invention may be used for example, as a CI signal detector for detecting a CI signal in a communication signal. The CI detector may be used in a communication device capable of supporting voice and video communication. As another example, the multi-frequency detector of the invention may be used in a device to detect a DTMF signal.

In the multi-frequency detector of the invention, an input signal which is to be analyzed for the occurrence of a predetermined signal sequence of data bits is input to a filter module. In accordance with the invention, the filter module carries out a band pass filtering process in which the passed frequency band includes all of the frequencies in the specified frequency set consisting of all of the frequencies used to represent the Dbits in the signal sequence to be detected. In a preferred embodiment of the invention, the passed frequency band has a plateau around each one of the frequencies in the frequency set, where adjacent plateaus are preferably separated by a local minimum.

The filtered signal is input to a frequency condition module that determines, on the basis of the detector module output whether the frequency of the filtered sequence is one of the specified frequencies. When one of the specified frequencies is detected, by the frequency condition module, it generates an output of the Dbit corresponding to the detected frequency. Otherwise the module generates a blank output (indicated herein by "n") indicating that none of the specified frequencies was detected. A sequence condition module may optionally search the output of the frequency condition module for the presence of the signal sequence to be detected. When the signal sequence is detected, the device generates a signal indicating that the signal sequence has been detected.

Thus, in one of its aspects, the present invention provides a method for detecting in a single or multi frequency signal, one or more frequencies from a predetermined set of frequencies, comprising:
- (a) subjecting the signal to a complex filter substantially passing all of the frequencies in the predetermined set of frequencies, to produce a complex filtered signal;
- (b) for each of one or more pairs of members of the complex filtered signal, determining a complex number $Y_d$ having a phase indicative of a phase difference between the two members of the pair; and
- (c) determining the frequency of the signal based upon the one or more complex numbers determined in step (b).

In another of its aspects, the invention provides a device for detecting in a single or multi frequency input signal, one or more frequencies from a predetermined set of frequencies, the device comprising a processor configured to:
- (a) subject the input signal to a complex filter substantially passing all of the frequencies in the predetermined set of frequencies, to produce a complex filtered signal; for each of one or more pairs of members of the complex filtered signal (a+bj) and (c+dj):
- (b) determine a complex number $Y_d$ having a phase indicative of a phase difference between the two members of the pair; and
- (c) determine the frequency of the signal based upon the one or more complex numbers determined in step (b).

In still another of its aspects, the invention provides an apparatus comprising the device according to the invention.

In yet another of its aspects, the invention provides a device comprising a processor configured, for each of the two or more communication lines, to:
  subject a single frequency input signal in the communication line to a complex filter substantially passing all of the frequencies in the predetermined set of frequencies, to produce a complex filtered signal; for each of one of more pairs of members of the complex filtered signal (a+bj) and (c+dj):
  determine a complex number $Y_d$ having a phase indicative of a phase difference between the two members of the pair;

determine the frequency of the input signal based upon the one or more complex numbers determined in step (b);

for each of the one or more predetermined frequencies, output a Dbit value associated with the predetermined frequency if the current frequency of the filtered signal is equal to the predetermined frequency;

output a Dbit value of n if the current frequency of the filtered signal is not equal to any one of the predetermined frequencies to generate a sequence of Dbits;

analyze the sequence of Dbits to detect the T1-N0 sequence: and connect the communication line to the modem when the T1-N0 sequence is detected in the communication line.

BRIEF DESCRIPTION OF THE DRAWINGS

In order to understand the invention and to see how it may be carried out in practice embodiments will now be described, by way of non-limiting example only with reference to the accompanying drawings, in which.

DETAILED DESCRIPTION OF EMBODIMENTS

The invention will first be described within the context of a CI signal detector configured to detect the T1-N0 signal sequence in a frequency modulated signal composed from two different Dbit types (0 and 1). This is done only for clarity in the description; it being evident that the invention may be extended to the detection of a frequency modulated signal composed from more than two Dbit types.

Figure 1:
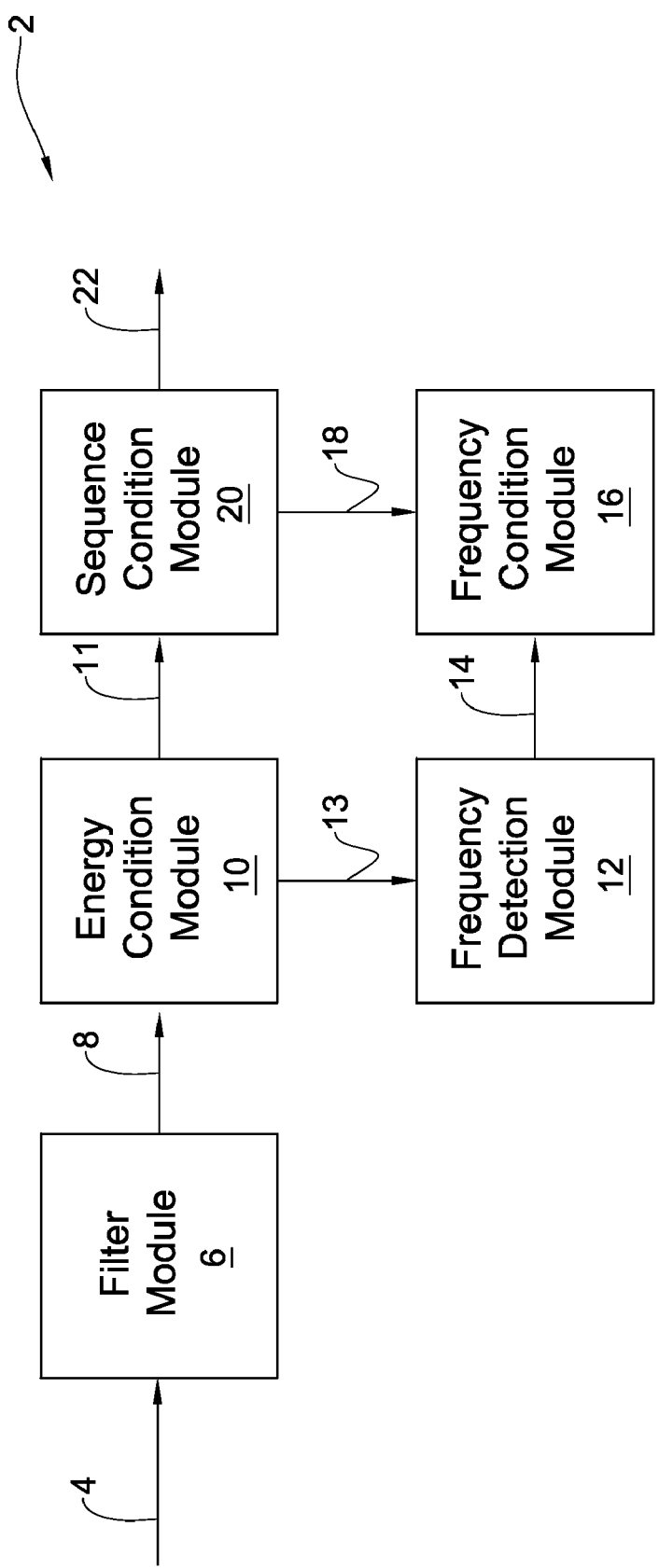
FIG. 1 shows a CI signal detector in accordance with one embodiment of the invention.

FIG. 1 shows a schematic representation of a CI signal detector, generally indicated by 2, in accordance with one embodiment of the invention. An input signal 4 which is to be analyzed for the presence of the T1-N0 sequence is first input to a filter module 6. As described in detail below, the filter module 6 carries out a filtering process in which frequencies around the two FSK frequencies used in a CI signal are transmitted. The output 8 of the filter module 6 is a sequence of complex numbers that is input to an energy condition module 10. The energy condition module 10 determines whether the present value of the sequence 8 has an energy level above a predetermined threshold value. If the present value of the sequence 8 does not have an energy level above the predetermined threshold, this result is input as a signal 11 to a sequence condition module 20 which outputs a result 22 that a CI signal has not been detected. If the present value of the sequence 8 has an energy value above the predetermined threshold, the present value of the sequence 8 is input to a frequency detection module 12 as a signal 13. The energy condition module then determines whether the sequence 8 has had an energy level above the predetermined threshold for at least a predetermined number of consecutive values. If the energy condition module 10 determines that the filtered signal does not meet this energy criterion, this result is input to the sequence condition module 20 which outputs a result 22 that a CI signal has not been detected.

When the energy condition module 10 determines that the filtered signal 8 satisfies the energy criterion, this is input to the frequency detection module 12 which generates, for each pair of consecutive complex values output from the filter module 10, a complex output whose phase is equal to the phase difference between the pair. The output 14 of the frequency detector module is input into a frequency condition module 16 that determines from its input, whether the frequency of the filtered signal 8 is one of the two FSK frequencies. When the 980 Hz frequency or the 1180 Hz frequency is detected by the frequency condition module 16, the module 16 generates an output 18 of "1" or "0", respectively. Otherwise the module 16 generates a blank output "n" indicating that neither one of the FSK frequencies was detected. The sequence 18 generated by the frequency condition module is input to a sequence condition module 20 which searches the sequence 18 for the presence of the T1-N0 sequence. The sequence condition module outputs an output 22 that is set to 1 when the T1-N0 sequence is detected. Otherwise, the output 22 is set to 0.

The Filter Module

Figure 2A:
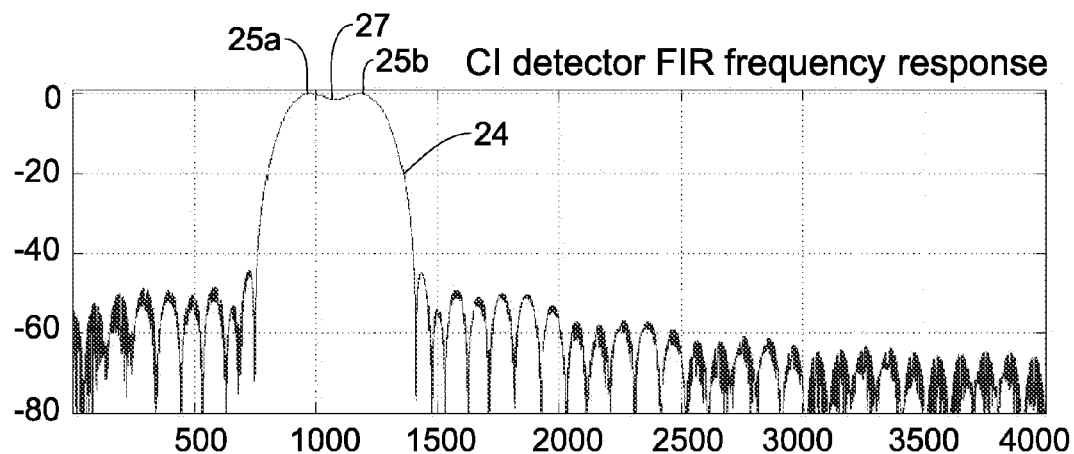
FIG. 2 shows a frequency response of a filter module for use in the CI signal detector of FIG. 1.
Figure 2B:
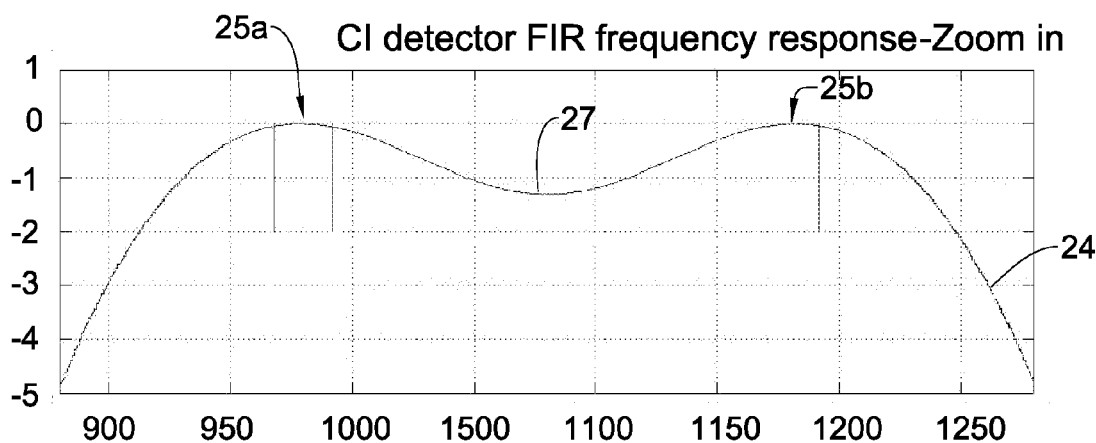

FIG. 2a shows the frequency response of the filter module 6 in accordance with one preferred embodiment of the invention. The frequency response has a transmission band 24 including the two FSK frequencies that is shown in greater detail in FIG. 2b. The transmission band 24 has a plateau 25a around the FSK frequency 980 and a plateau 25b around the FSK frequency 1180. The two transmission peaks 25a and 25b are separated by a local minimum 27. The filter module 6 uses an 80 tap complex FIR (finite input response) to compute one complex output every 2 ms. The input signal 4 typically has a baud rate of 300 baud, and a sampling rate greater than 300 baud. For example, a sampling rate of 500 baud may be used, in which case every 16 samples (2 msec) a new FIR starts to run. Every run generates a single complex number indicative of the real and the imaginary frequency components. The frequency response shown in FIG. 2 is achieved using FIR coefficients generated as follows.

The frequency bandwidth of the filter module 6 is designed to extend from about 100 Hz below the carrier frequency Fc of the input signal 4 (1080 Hz) to 100 Hz above the carrier frequency (with a deviation of up to +/−12 Hz). The input signal 4 is shifted by the carrier frequency Fc by multiplying the input signal 4 by $\exp(j*Fc)$, so that the Fc is set to 0 Hz. Low pass filtering is then run with a high attenuation out-band using a Hamming window convoluted with a Kaiser window. The response of this band pass filter is saddle shaped and flattened at the two FSK frequencies. This is accomplished by multiplying by the two symmetric side frequencies near of the carrier frequency (Fc), $\exp(j*((Fc+df)$ and $\exp(j*(Fc-dt)$.

In a preferred embodiment the following process is carried out

Win_size=80; df=81; Gb=−0.8; dp=−½; dw=16; fc=1080; Fs=8000;

% Make lowpass fir filter.

Win=conv(hamming(Win_size−dw+1),kaiser(dw,1));

% Complex shift by:

expFp=exp(j*2*pi*([1:length(Win)/2]*(fc+df)/Fs+dp*(fc+df)/Fs));

expFn=exp(j*2*pi*([1:length(Win)/2]*(fc−df)/Fs+dp*(fc−df)/Fs));

expFc=exp(j*2*pi*([1:length(Win)/2]*(fc)/Fs+dp*(fc)/Fs));
s=expFp+expFn+Gb*expFc;
% make symmetric complex freq.
s=[conj(s(end:-1:1)) s];
% Calculate complex FIR coedf.
B=s. *Win';

The filter s is converted into a symmetric complex form by setting, s=[conj(s(end:-1:1)) s]. Since the filter module 6 uses a symmetric window, it is sufficient to use only half of the window. The real window is based oil cosines and thus has positive symmetry. The imaginary window is based on sines and thus has negative symmetry. Because of this negative symmetry, the half imaginary window is multiplied by '−1' when being Using it for the other half. A complex FIR coefficient B is calculated as B=sWin'.

Implementing this process with the parameter values specified above, the filter coefficients B shown in Table 1 in fix point format Q2.13 are obtained.

TABLE 1

| WinImage_Fix | WinReal_Fix |
|---|---|
| 68, | 39, |
| 150, | −51, |
| 93, | −225, |
| −147, | −299, |
| −415, | −114, |
| −447, | 294, |
| −91, | 639, |
| 495, | 579, |
| 879, | 14, |
| 670, | −737, |
| −121, | −1099, |
| −986, | −693, |
| −1250, | 300, |
| −628, | 1186, |
| 483, | 1278, |
| 1264, | 478, |
| 1124, | −595, |
| 268, | −1117, |
| −561, | −798, |
| −741, | −82, |
| −338, | 307, |
| 2, | 108, |
| −229, | −196, |
| −760, | 108, |
| −706, | 1075, |
| 489, | 1786, |
| 2204, | 1080, |
| 2851, | −1181, |
| 1210, | −3533, |
| −2175, | −3813, |
| −4933, | −1022, |
| −4532, | 3403, |
| −492, | 6245, |
| 4745, | 4897, |
| 7309, | −345, |
| 4846, | −6048, |
| −1394, | −7988, |
| −7148, | −4381, |
| −8192, | 2520, |
| −3566 | 7898 |

Although the filter module 6 uses a time window of including 80 taps, the main coefficient energy is on slightly more than one FSK bit, corresponding to about 30 samples. Using a sliding window with a 2 msec delay gives overlapped FSK bits, for more data.

The Energy Condition Module

Figure 3:
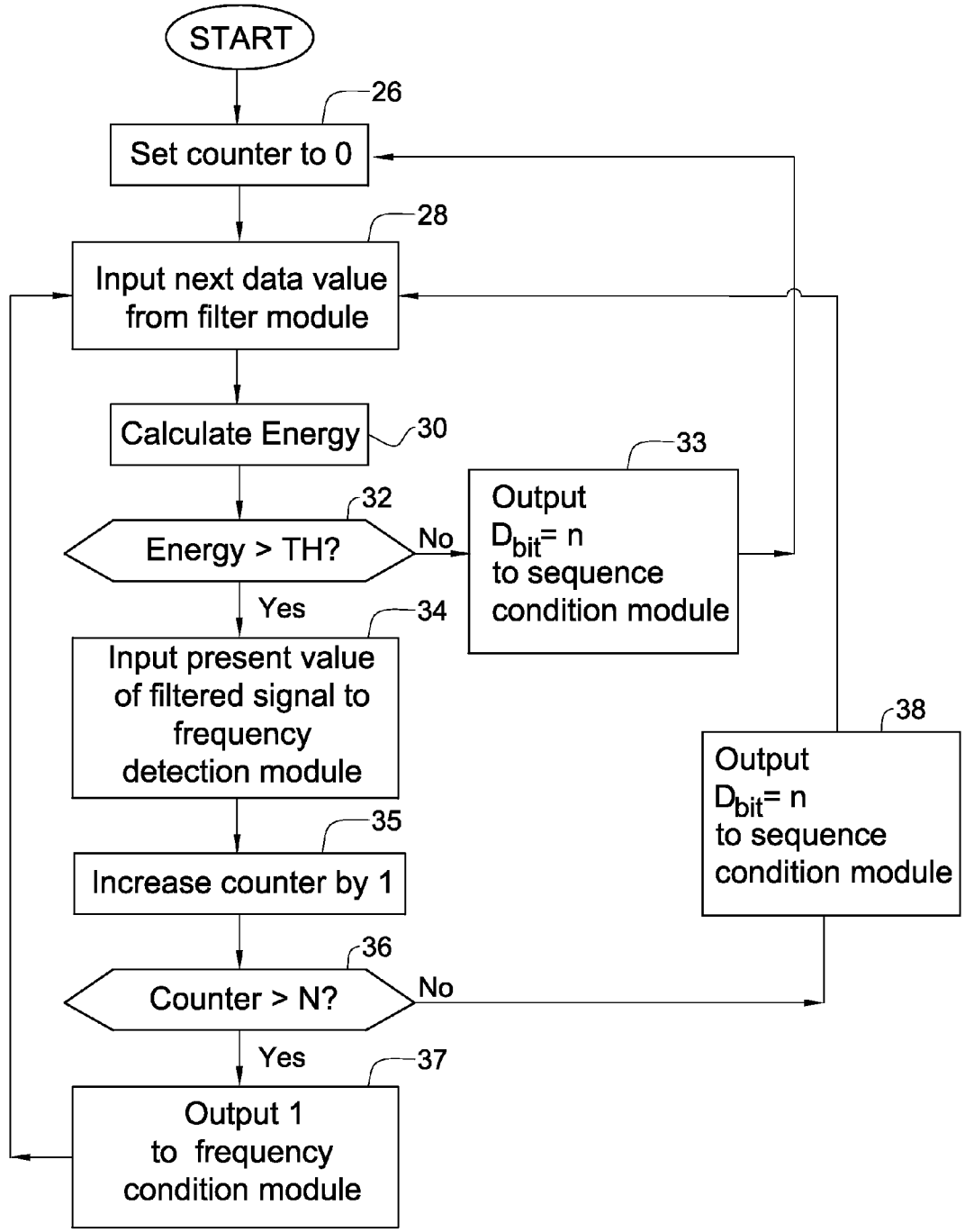
FIG. 3 shows a method carried out by the energy condition module for use in the CI signal detector of FIG. 1.

The output 8 from the filter module 6 is a time sequence Of complex numbers that is input to the energy condition module 10. FIG. 3 shows a flow chart diagram for a method carried out by the energy condition module 10. In step 26 the value of a counter is set to 0. In step 28 a complex data sample a+bi from the output 8 is input to the energy condition module 10. In step 30, the energy of the output 22 is calculated using the algebraic expression Energy=$a^2+b^2$. In step 32 it is determined whether the energy is above a predetermined threshold TH. If no, then in step 33 an output of n is generated to the sequence condition module 20 and the process returns to step 26 with the counter being reset to 0. If the energy is above the threshold TH, then in step 34 the present value of the filtered signal 8 is input to the frequency detector module 12. The process then continues with step 35 where the value of the counter is increased by 1. In step 36 it is then determined whether the counter is greater than or equal to a predetermined constant N. If yes, then in step 37 an output of 1 is generated to the frequency condition module 16 and the process returns to step 28 with the next data sample being input to the energy condition module 10. If the counter is not greater than or equal to the predetermined constant N, then in step 38 an output of n is generated to the sequence condition module 20 and the process returns to step 28 with the next data sample being input to the energy condition module 10.

The final energy decision is thus based upon the last N outputs from the filter module 6. The energy of all of the last N outputs must exceed the energy threshold TH in order for an output of 1 to be generated by the energy condition module 10. The larger the N, the larger the immunity to noise and other signals superimposed on the CI signal. 4, but there is less sensitivity to "talk off". N may be set, for example to 4.

In order to reduce or prevent MIPS (million instructions per second) peaks, the filter module 6 should run every sample, while the other modules (the energy condition module 10, the frequency detection module 12, the frequency condition module 16 and the sequence condition module 20) run every 2 ms.

The Frequency Detection Module

When the frequency detection module 12 receives an input from the energy condition module 10 that the energy of the filtered signal 18 has been above the predetermined threshold TH for at least the N most recent data values, the frequency detection module 12 determines whether the frequency of the signal is one of the two FSK signals.

Figure 4:
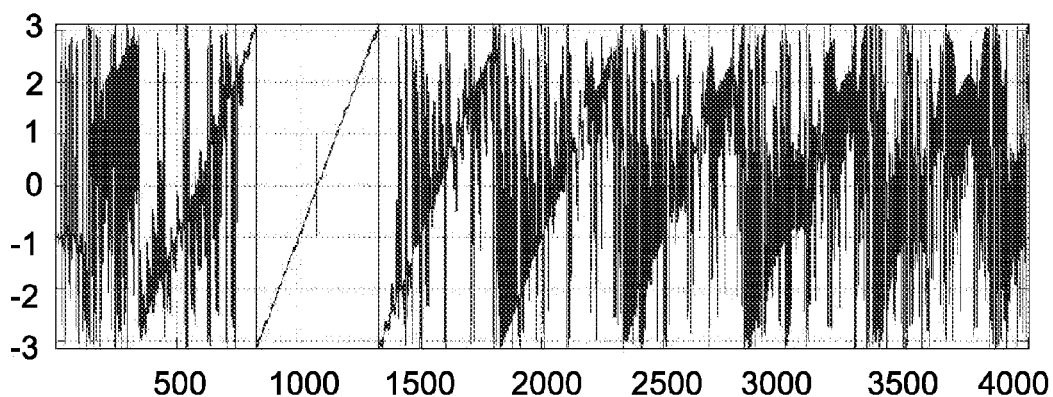
FIG. 4 shows the normalized phase difference between two consecutive Outputs from the filter module as a function of the frequency of the filtered signal.

During a time period when the frequency of the input signal 4, and hence the frequency of the filtered signal 8 is constant, all pairs of consecutive data values in the sequence 8 have a fixed phased difference α that is uniquely determined by this constant signal frequency and the constant time delay between consecutive data values. There is thus a one-to-one correspondence between the frequency of the signal 8 and the phase difference α. FIG. 4 shows the normalized phase between two consecutive data values in the sequence 8 as a function of the frequency of the signal 8. In the normalization shown in FIG. 5, the carrier frequency Fc has been set at 0 phase for the sake of clarity in the description.

When the delay is 2 msec (16 sample) and Fs=8000 Hz then Fs/16=500 Hz so that every 500 Hz the phase changes sign. In this case, the relationship between the normalized phase and the frequency of the signal 8 in the rage of ±250 Hz around Fc is:

$$\theta_0 = \frac{2\pi}{500} * (f_0 - f_c)$$

where $f_0$ is the frequency of the signal 8, and $f_c$ is the carrier frequency. More generally, for non-normalized phases:

$$\theta_0 = \frac{2\pi}{f_b} * \text{rem}\left(\frac{f_0 - f_b}{f_b}\right)$$

where $f_b$ is the frequency at which the phase changes sign (the "flip frequency")

Given two consecutive data points in the output 8, $y_a=a+bj=Ae^{jH}$ and $y_1=c+dj=Ce^{jD}$, the frequency detector module 12 calculates a vector $Y_d$ where $Y_d=y_0\cdot\text{conj}(y_1)=ACe^{j(H-D)}=(a+bj)(c-dj)=g+hj$.

The phase of the vector $Y_d$ is thus equal to the phase difference α between the two consecutive vectors $y_0$ and $y_1$. The frequency detector module outputs as an output 14 to the frequency condition module, the vector $Y_d$.

In a neighborhood of the FSK frequencies, there should not be more than one cycle of the phase because more than one cycle of the phase may cause misdetection. As shown in FIG. 4, this situation can arise, for example, with a time delay of more than 16 samples, using this 80 tap FIR. A delay of about 2 msec is the optimum delay that an 80 tap filter can support.

The Frequency Condition Module

The frequency condition module 16 determines whether the frequency of the signal 8 is one of the two FSK frequencies using an algorithm involving the vector $Y_d$. If the phase α of $Y_d$ is in a first range $TH_1<α<TH_2$ corresponding to a predetermined range of the FSK frequency 980 Hz, the frequency condition module 16 outputs an output 18 of Dbit=1 to the sequence condition module 20, indicating that the value of the signal 4 is 1. If the value of α is in a second range $TH_3<α<TH_4$, where $TH_2<TH_3$, corresponding to a predetermined range of the FSK frequency 1180 Hz, the frequency condition module 16 outputs an output 18 of Dbit=0, indicating that the value of the signal 4 is 0. Otherwise, the frequency detector module outputs an output 18 of Dbit=n.

Figure 5:
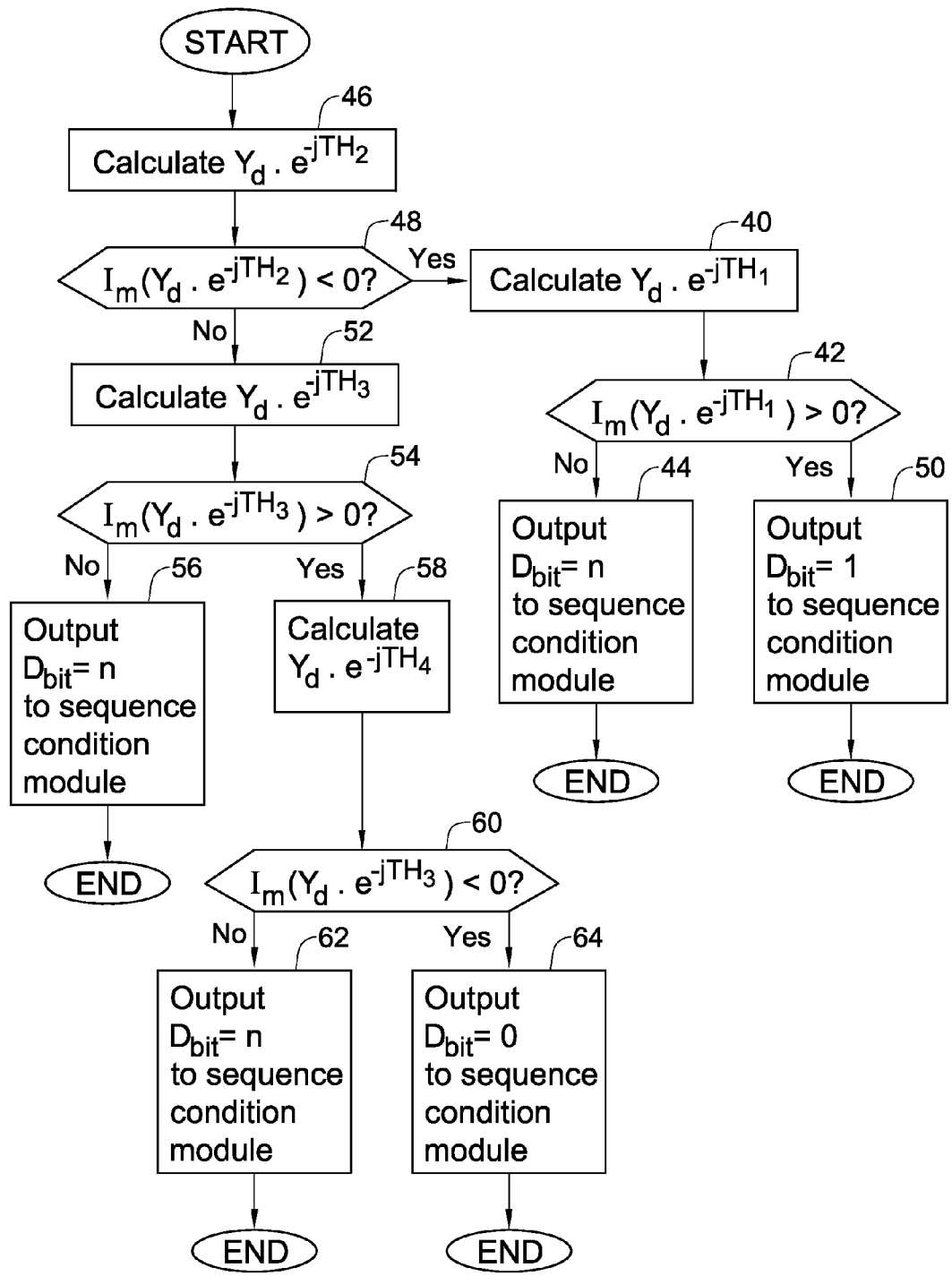
FIG. 5 shows a method for determining whether the phase difference between two consecutive outputs from the filter module is in a predetermined range.

In practice, when determining whether α is in a particularly range, it may be computationally more efficient to operate on the real and imaginary parts of $Y_d$, rather than directly on the phase α of $Y_d$. FIG. 5 shows a flow chart for a method of determining, whether the phase difference α is in either one of the intervals $TH_1<α<TH_2$ or $TH_3<α<TH_4$ that operates on the imaginary part of $Y_d$. In step 46 the vector $Y_d$ is rotated by $-TH_2$ by multiplying $Y_d$ by exp $(-jTH_1)$. In step 48, it is determined whether the imaginary part of the rotated vector $Y_d\exp(-jTH_2)$ is less than 0. If the imaginary part of $Y_d\exp(-jTH_2)$ is less than 0, then in step 40, the vector Yd is rotated by $-TH_1$ by multiplying $Y_d$ by $\exp(-jH_1)$. Then, in step 42 it is determined whether the imaginary part of the rotated vector $Y_d\exp(-jTH_1)$ is greater than 0. If no, then $α<TH_1$ so that the frequency of the signal 8 is not 980 Hz and is not 1180 Hz. In this case, in step 44, the frequency condition module 16 outputs an output of Dbit=n to the sequence condition module 20, and the process ends. If the imaginary part of $Y_d\exp(-jTH_1)$ is greater than 0, then $TH_1≤α≤TH_2$ and the frequency of the signal 8 is 980 Hz. In this case, in step 50 the frequency condition module 16 outputs a databit (Dbit) output of "1", and the process ends.

If in step 48 it is determined that the imaginary part of the rotated vector $Y_d\exp(-jTH_2)$ is not less than 0. then in step 52, the vector $Y_d$ is rotated by $-TH_3$ by multiplying $Y_d$ by exp $(-jTH_3)$. Then, in step 54 it is determined whether the imaginary part of the rotated vector $Y_d\exp(-jTH_3)$ is greater than 0. If no, then $α<TH_3$ and the frequency of the signal 8 is not 980 Hz and is not 1180 Hz. In this case, in step 56, the frequency condition module 16 outputs Dbit=n and the process ends. If the imaginary part of $Y_d\exp(-jTH_3)$ is greater than 0, then $TH_3>α$. In this case the process continues with step 58 where the vector $Y_d$ is rotated by $-TH_4$ by multiplying $Y_d$ by exp $(-jTH_4)$. Then, in step 60 it is determined whether the imaginary part of the rotated vector $Y_d\exp(-jTH_4)$ is less than 0. If no, then $α>TH_4$ and the frequency of the signal 8 is not 980 Hz and is not 1180 Hz. In this case, in step 62, the frequency condition module 16 outputs a Dbit=n and the process ends. If the imaginary part of $Y_d\exp(-jTH_4)$ is less than zero, then $TH_3<α<TH_4$, and the frequency of the signal 8 is 1180 Hz. In this case, in step 64 the frequency condition module 16 outputs a databit (Dbit) output of "0", and the process ends.

When a signal is superimposed on the CI signal, "frequency noise" may cause the phase α of $Y_d$ to leave the detection zone. Frequency noise may be reduced by using instead of $Y_d$ in the algorithm of FIG. 5, the mean value of the M most recent values of $Y_d$, where M is a predetermined constant. M may be, for example, equal to 4.

The Sequence Condition Module

The output 18 of the frequency condition module 16 consisting of the sequence of Dbits is input to the sequence condition module 20. The sequence condition module 20 searches the output 18 for the preamble of the T1-N0 sequence (the portion of the T1-N0 sequence consisting of 10 ones ('1111111111') followed by 10 synchronization bits ('0000000001')).

The fact that there is no synchronization between the sampling rate and the baud rate and the fact that the Dbit is based on an average of a few windows, man cause Dbit misdetection at the beginning of the T1-N0 sequence and in the transition of bits. Thus, for example, when the signal 4 includes the T1-N0 sequence preamble . . . n,n,1,1,1,1,1,1,1,1,1,0,0,0,0,0,0,0,0,1 . . .

the corresponding output 18 of the frequency condition module 16 may be

. . . n,n,n,1,1,1,1,1,1,1,1,1,n,0,0,0,0,0,0,n,1 . . .

The distance in the T1-N0 preamble between the first '1' to the first '0' is known as the "flip distance" and is equal to 10 FSK bits or 17 Dbits (The Dbit length is obtained by dividing the FSK bit length by 0.6). The T1-N0 preamble contains 9 flips (a 1 separated from a subsequent 0) of length 10 FSK bits or 17 Dbits. Due to the problem of misdetection, in one preferred embodiment, in order to detect the T1-N0 sequence preamble, instead of searching the output 18 for consecutive flips of length 10 FSK bits, the output 18 is searched for predetermined number of consecutive occurrences of a shorter flip. For example, the T1-N0 preamble maybe detected in the output 18 by searching for consecutive occurrences of a flip of length 7 FSK bits (12 Dbits). When a predetermined number of such flips is detected, the sequence condition module 18 outputs an output 22 of "1" indicating that the T1-N0 signal has been detected. Otherwise, the output 22 is set to 0, indicating that the T1-N0 signal has not been detected.

The higher the number of consecutive occurrences needed to generate an Output 22 of "1", the lower die probability for false detection, but the higher the probability for not detecting the T1-N0 sequence preamble when present. On the other hand, the lower the number of consecutive occurrences needed to generate an output 22 of "1" the higher the probability for false detection but the lower probability for not detecting the T1-N0 sequence preamble when present. For most implementations, a value of 7 for the predetermined constant is preferable.

Since the sequence condition module searches the signal 18 on) and looks for the CI preamble, and the preamble itself is only two thirds of the CI signal, he detection decision is made after no more than 66 mSec from the beginning of the CI.

Figure 6:
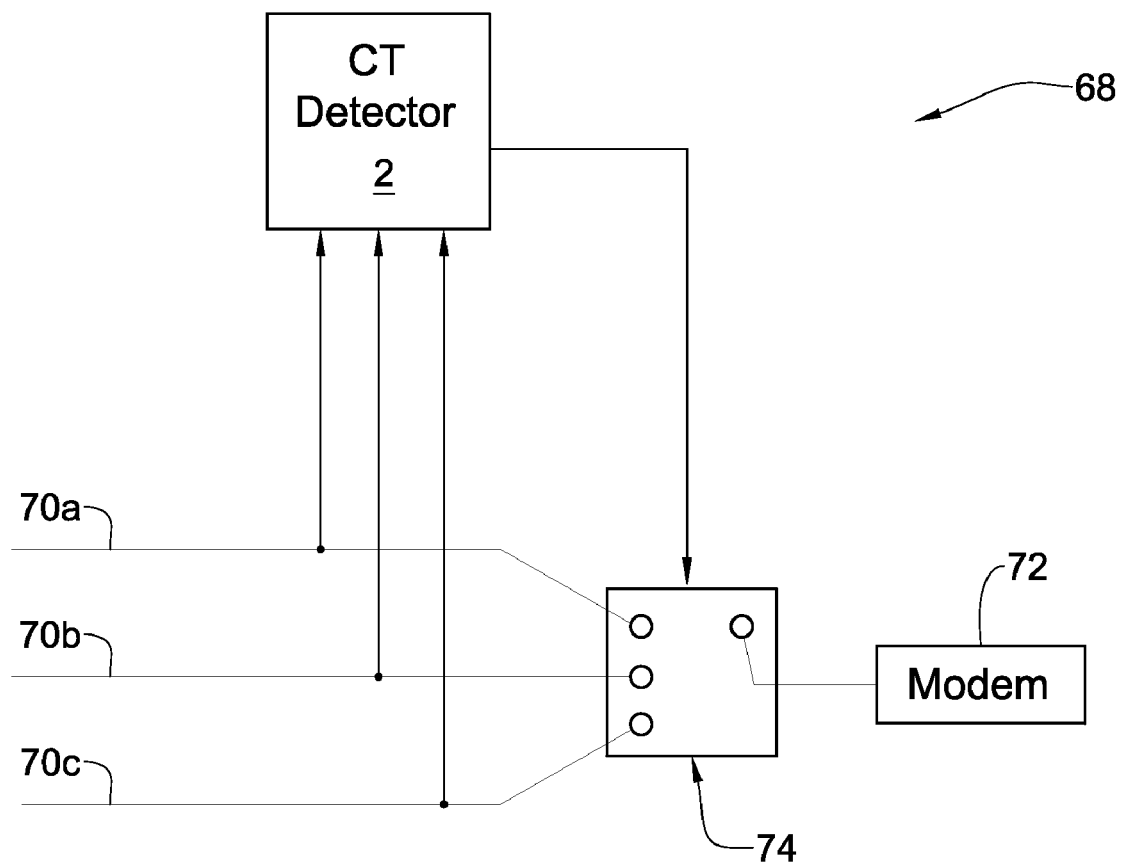
FIG. 6 shows an implementation of a call indicator detector at a multi line communication node.

FIG. 6 shows an implementation of the CI detector 2 at a communication node 68 of a communication system. The CI detector 2 simultaneously monitors each of two or more communication lines 70 at the node for the occurrence of the T1-N0 sequence. Three communication lines 70a, 70b, and 70c are shown in FIG. 6. This is by way of example only, and the CI detector 2 may be implemented at a communication node 68 involving any number of lines 70. The implementation further comprises a single modem 72. When the sequence condition module 20 (FIG. 1) of the CI detector 2 detects the T1-N0 sequence in one of the communication lines 70, for example, the communication line 70a, the CI detector 2 connects the communication line 70a to the modem 72 by means of a switch 74 and causes the modem to change its mode of communication from voice to video. In this implementation, a single modem may be used, and use of a dedicated modem for each of the communication lines can be avoided.

Figure 7:
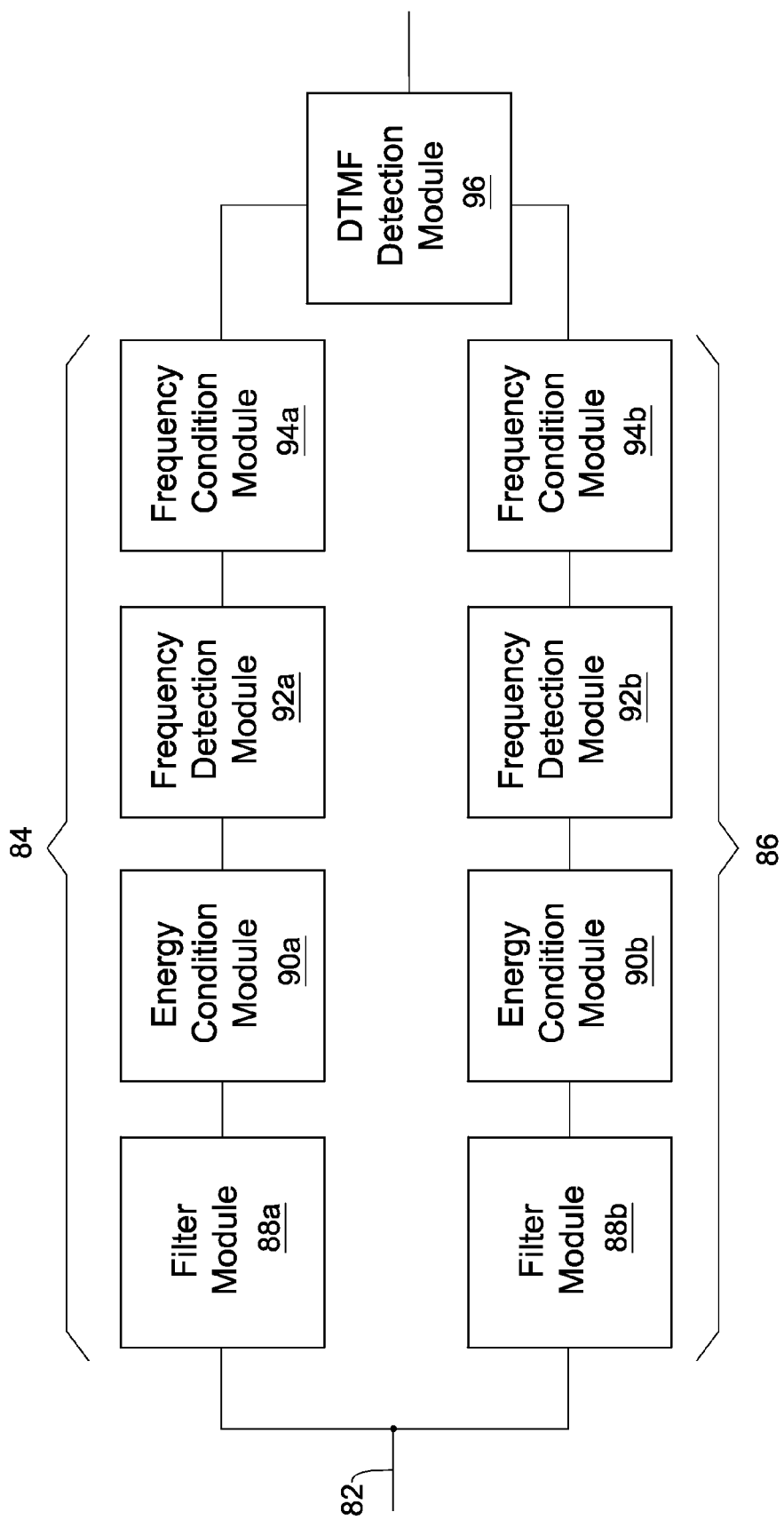
FIG. 7 shows a DTMF detector in accordance with one embodiment of the invention.

FIG. 7 shows an implementation of the multi-frequency detector of the invention in a DTMF detector 80. The DTMF detector 80 searches an input signal 82 for the presence of a DTMF signal which consists of an additive combination of a high frequency and a low frequency where the high frequency is from a predetermined set of high frequencies and the low frequency is from a predetermined set of low frequencies.

In the DTMF detector 80, the input signal 82 is simultaneously input into a high frequency detector 84 and a low frequency detector 86. The high frequency detector 84 consists of a high frequency filter module 88a that transmits the frequencies of the predetermined set of high frequencies and is preferably constructed essentially as described above in reference to the filter module 6. The output of the filter module 88a is input to an energy condition module 90a which operates essentially as described above in reference to the energy condition module 10. When the filtered signal satisfies the energy condition of the energy condition module, the filtered signal is analyzed by means of a high frequency detection module 92a and a high frequency condition module 94a, which operate as described above in reference to the frequency detection module 12 and the frequency condition module 16, respectively. When the high frequency condition module 94a detects one of the high frequencies, the detected high frequency is input to a DTMF detection module 96. Otherwise, the high frequency condition module 94a outputs an output of "n".

The low frequency detector 84 consists of a low frequency filter module 88b that transmits the frequencies of the predetermined set of low frequencies and is preferably constructed essentially as described above in reference to the filter module 6. The output of the low frequency filter module 88b is input to an energy condition module 90b which operates essentially as described above in reference to the energy condition module 10. When the filtered signal satisfies the energy condition of the energy condition module 90b, the filtered signal is analyzed by means of a low frequency detection module 92b and a low frequency condition module 94b, which operate as described above in reference to the frequency detection module 12 and the frequency condition module 16, respectively. When the low frequency condition module 94b detects one of the low frequencies, the detected low frequency is input to a DTMF detection module 96. Otherwise, the low frequency condition module 94a outputs an output of "n".

The DTMF detection module 96 thus receives inputs from the high frequency condition module 94a and the low frequency condition module 94b. The DTMF detection module detects pairs of simultaneously obtained inputs from the two frequency condition modules 94a and 94b indicating that one of the predetermined high frequencies was detected in the input signal 82 simultaneously with the detection of one of the predetermined low frequencies. The DTMF detection module 96 may further determine whether the detected pair of high and low frequencies satisfies any other predetermined requirements, especially requirements specified by a communications standard. When the DTMF detection module detects that a predetermined high frequency and a predetermined low frequency were simultaneously detected in the input signal 82, and meet any predetermined requirements, the DTMF detection module outputs an output indicative of this.

The invention claimed is:

1. A method for detecting a T1-N0 signal at a multiline communication node, the multi-line communication node comprising two or more communication lines, the method comprising:
   (a) subjecting a single frequency input signal in the communication line to a complex filter substantially passing all of the frequencies in the predetermined set of frequencies, to produce a complex filtered signal
   (b) for each of one or more pairs of members of the complex filtered signal (a+bj) and (c+dj)
      (i) determining a complex number $Y_d$ having a phase indicative of a phase difference between the two members of the pair;
      (ii) determining the frequency of the input signal based upon the one or more complex numbers determined in step (b)(i);
   (c) for each of the one or more predetermined frequencies
      (i) outputting a Dbit value associated with the predetermined frequency if the current frequency of the filtered signal is equal to the predetermined frequency;
      (ii) outputting a Dbit value of n if the current frequency of the filtered signal is not equal to any one of the predetermined frequencies, to generate a sequence of Dbits;
   (d) analyzing the sequence of Dbits to detect the T1-N0 sequence; and
   (e) connecting the communication line to the modem when the T1-N0 sequence is detected in the communication line.

2. The method according to claim 1 wherein the complex filter consists of a first real filter of the input signal producing a real part of the complex signal and a second real filter of the input signal producing the imaginary part of the complex signal.

3. The method according to claim 2 wherein the first and second real filters have the same magnitude.

4. The method according to claim 1 wherein, for each of the one or more frequencies in the predetermined set of frequencies, the filter has an essentially constant frequency response in a neighborhood of the frequency.

5. The method according to claim 1 wherein the complex filter decimates the input signal at a rate such that in a range of frequencies containing the predetermined set of frequencies, the frequency of the input signal is uniquely determined by the phase of $Y_d$.

6. The method according to claim 1 wherein the complex filter decimates the input signal at a rate greater than a bandwidth of the complex filter.

7. The method according to claim 6 wherein $Y_d$ is calculated using the algebraic expression $Y_d=(a+bj)*cong(c+dj)$.

8. The method according to claim 1 further comprising determining whether a current value of the filtered sequence satisfies a predetermined energy criterion and detecting each of the predetermined frequencies in the filtered signal when the filtered sequence satisfies the predetermined energy criterion.

9. The method according to claim 8 wherein the predetermined energy criterion is that the energy of the filtered signal exceeds a predetermined threshold for at least a predetermined number N of recent values in the filtered sequence.

10. The method according to claim 1 wherein $Y_d$ has a phase α equal to the phase difference of the first and second complex numbers.

11. The method according to claim 1 wherein the step of determining the frequency comprises:
  1) calculating a complex number number $Y_s$ as an average of one or more of the $Y_d$; and
  2) for each frequency in the set of predetermined frequencies determining whether the phase α of $Y_s$ is in a predetermined range $TH_1 < α < TH_2$ associated with the predetermined frequency, the filtered signal having a current frequency value equal to the predetermined frequency if the phase α of $Y_s$ is in the predetermined range.

12. The method according to claim 11 wherein the predetermined range associated with the predetermined frequency is determined based upon the predetermined frequency and a time delay between the first and second complex numbers.

13. The method according to claim 11 wherein the step of determining whether $TH_1 < α < TH_2$ comprises:
  a) Multiplying $Y_s$ by $exp(jTH_1)$ and determining if $Im(Y_s * exp(jTH_1)) > 0$; and
  b) Multiplying $Y_s$ by $exp(jTH2)$ and determining if $Im(Y_s * exp(jTH_2)) < 0$,
  wherein $TH_1 < α < TH_2$ if $Im(Y_s * exp(jTH_1)) > 0$ and $Im(Y_s * exp(jTH_2)) < 0$.

14. The method according to claim 1 wherein the step of analyzing the sequence of Dbits to detect the T1-N0 signal comprises:
  (a) counting a number of flips of a predetermined flip distance in the Dbit sequence, a flip being a 1 separated from a subsequent 0 by the flip distance; and
  (b) identifying the T1-N0 sequence when a predetermined number of consecutive flips are detected in the Dbit signal.

15. The method according to any one of claim 14 wherein the predetermined sequence of frequencies is a DTMF signal.

16. A system for detecting a T1-N0 signal at a multiline communication node, the multi-line communication node comprising two or more communication lines, the system comprising:
  (a) a modem;
  (b) a device comprising a processor configured, for each of the two or more communication lines, to:
    (i) subject a single frequency input signal in the communication line to a complex filter substantially passing all of the frequencies in the predetermined set of frequencies, to produce a complex filtered signal;
    (ii) for each of one or more pairs of members of the complex filtered signal (a+bj) and (c+dj)
      (1) determine a complex number Yd having a phase indicative of a phase difference between the two members of the pair;
      (2) determine the frequency of the input signal based upon the one or more complex numbers determined in step ((b)(1));
    (iii) for each of the one or more predetermined frequencies
      (1) output a Dbit value associated with the predetermined frequency if the current frequency of the filtered signal is equal to the predetermined frequency;
      (2) output a Dbit value of n if the current frequency of the filtered signal is not equal to any one of the predetermined frequencies, to generate a sequence of Dbits;
    (iv) analyze the sequence of Dbits to detect the T1-N0 sequence; and
    (v) connect the communication line to the modem when the T1-N0 sequence is detected in the communication line.

17. The device according to claim 16 wherein the complex filter consists of a first real filter of the input signal producing a real part of the complex signal and a second real filter of the input signal producing the imaginary part of the complex signal.

18. The device according to claim 17 wherein the first and second real filters have the same magnitude.

19. The device according to claim 16 wherein, for each of the one or more frequencies in the predetermined set of frequencies, the filter has an essentially constant frequency response in a neighborhood of the frequency.

20. The device according to claim 16 wherein the complex filter decimates the input signal at a rate such that in a range of frequencies containing the predetermined set of frequencies, the frequency of the input signal is uniquely determined by the phase of Yd.

21. The device according to claim 16 wherein the complex filter decimates the input signal at a rate greater than a bandwidth of the complex filter.

22. The device according to claim 16 wherein the processor is further configured to determine whether a current value of the filtered sequence satisfies a predetermined energy criterion and detecting each of the predetermined frequencies in the filtered signal when the filtered sequence satisfies the predetermined energy criterion.

23. The device according to claim 22 wherein the predetermined energy criterion is that the energy of the filtered signal exceeds a predetermined threshold for at least a predetermined number N of recent values in the filtered sequence.

24. The device according to claim 16 wherein $Y_d$ has a phase α equal to the phase difference of the first and second complex numbers.

25. The device according to 16 wherein $Y_d$ is calculated using the algebraic expression $Y_d = (a+bj) * cong(c+dj)$.

26. The device according to claim 16 wherein determining the frequency comprises:
  a) calculating a complex number $Y_s$ as an average of one or more of the $Y_d$; and
  b) for each frequency in the set of predetermined frequencies, determining whether the phase α of $Y_s$ is in a predetermined range $TH_1 < α < TH_2$ associated with the predetermined frequency, the filtered signal having a current frequency value equal to the predetermined frequency if the phase α of $Y_s$ is in the predetermined range.

27. The device according to claim 26 wherein the predetermined range associated with the predetermined frequency is determined based upon the predetermined frequency and a time delay between the first and second complex numbers.

28. The device according to claim 26 wherein the step of determining whether $TH_1 < α < TH_2$ comprises:
  i) multiplying $Y_s$ by $exp(jTH_1)$ and determining if $Im(Y_s * exp(jTH_1)) > 0$; and
  ii) multiplying $Y_s$ by $exp(jTH_2)$ and determining if $Im(Y_s * exp(jTH_2)) < 0$;
  wherein $TH_1 < α < TH_2$ if $Im(Y_s * exp(jTH_1)) > 0$ and $Im(Y_s * exp(jTH_2)) < 0$.

29. The device according to claim 16 being a call indicator (CI) detector.

30. An apparatus comprising the device according to claim 16.

31. The apparatus according to claim 30 being a communication device.

32. The apparatus according to claim 30 being a DTMF detector.

* * * * *